United States Patent [19]

Bolli et al.

[11] Patent Number: 5,094,643
[45] Date of Patent: Mar. 10, 1992

[54] CONNECTING DEVICE FOR TOY CONSTRUCTION ELEMENTS

[75] Inventors: Peter Bolli, Steinhausen; Heinz Looser, Barr, both of Switzerland

[73] Assignee: Interlego A.G., Baar, Switzerland

[21] Appl. No.: 598,681

[22] PCT Filed: Feb. 19, 1990

[86] PCT No.: PCT/CH90/00039

§ 371 Date: Oct. 11, 1990

§ 102(e) Date: Oct. 11, 1990

[87] PCT Pub. No.: WO90/09823

PCT Pub. Date: Sep. 7, 1990

[30] Foreign Application Priority Data

Feb. 24, 1989 [CH] Switzerland .............................. 681/89

[51] Int. Cl.$^5$ .................... A63H 33/06; A63H 33/12; A63H 33/08; B25G 3/00
[52] U.S. Cl. .................... 446/121; 446/102; 446/125; 403/348; 403/359
[58] Field of Search ............... 403/348, 356, 357, 359; 446/102, 103, 104, 105, 106, 116, 120, 121, 122, 125

[56] References Cited

U.S. PATENT DOCUMENTS

| 2,457,942 | 1/1949 | Van Zandt | 403/359 X |
| 2,765,581 | 10/1956 | Adler | 446/121 |
| 2,886,358 | 5/1959 | Münchbach | 403/359 |
| 3,335,580 | 8/1967 | Simpson, Jr. | 403/359 X |
| 4,124,949 | 11/1978 | Bach et al. | 446/102 X |
| 4,261,668 | 4/1981 | Rigal | 403/359 X |
| 4,859,110 | 8/1989 | Dommel | 403/359 X |
| 4,957,387 | 9/1990 | Nasu | 403/359 X |

FOREIGN PATENT DOCUMENTS

| 3218072 | 12/1982 | Fed. Rep. of Germany | 446/120 |
| 2087743 | 6/1982 | United Kingdom | 446/102 |
| 2184201 | 6/1987 | United Kingdom | 403/359 |

Primary Examiner—Robert A. Hafer
Assistant Examiner—D. Neal Mair
Attorney, Agent, or Firm—Kane, Dalsimer, Sullivan, Kurucz, Levy, Eisele and Richard

[57] ABSTRACT

A toy construction set connection device consists of a shaft and a shaft bushing. The bushing consists of two bushing parts which are fixedly mountable on the shaft. By means of an axial or rotational displacement of the second bushing part relative to the first bushing part, the whole shaft bushing can be anchored in a desired transverse groove on shaft. The anchoring may be released by pulling the second bushing part from the first part.

15 Claims, 6 Drawing Sheets

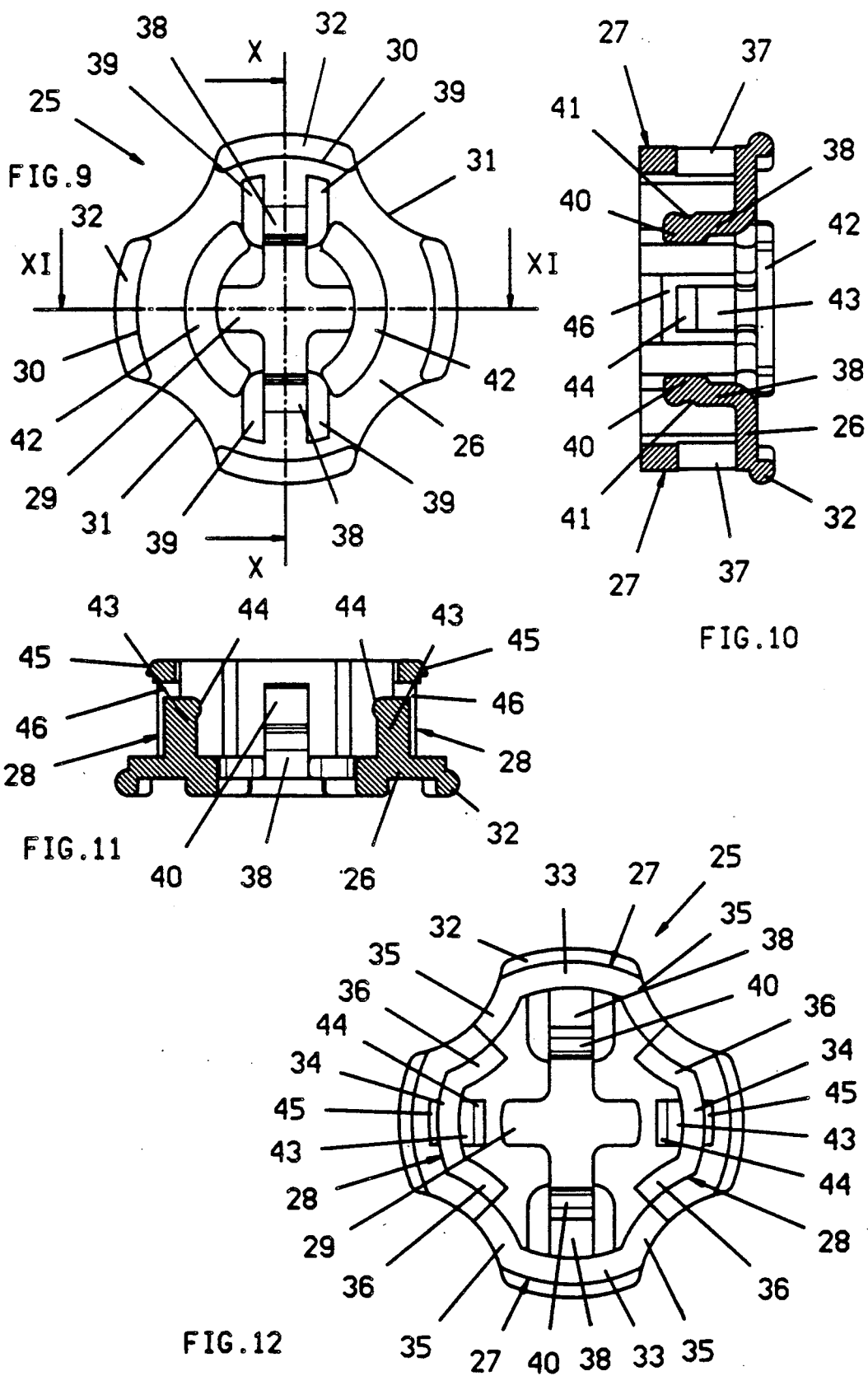

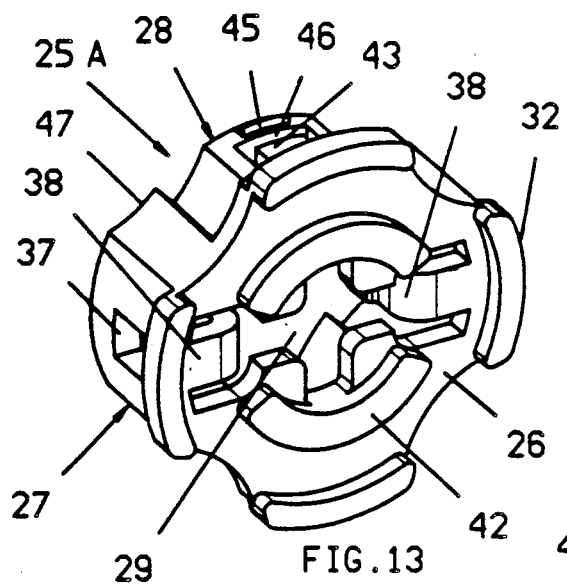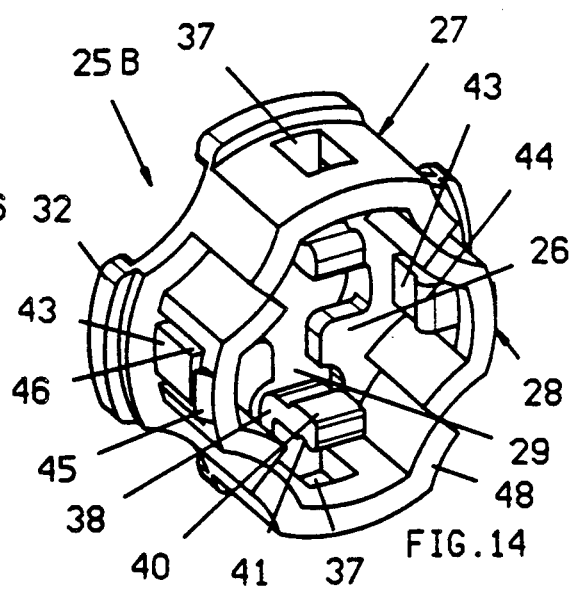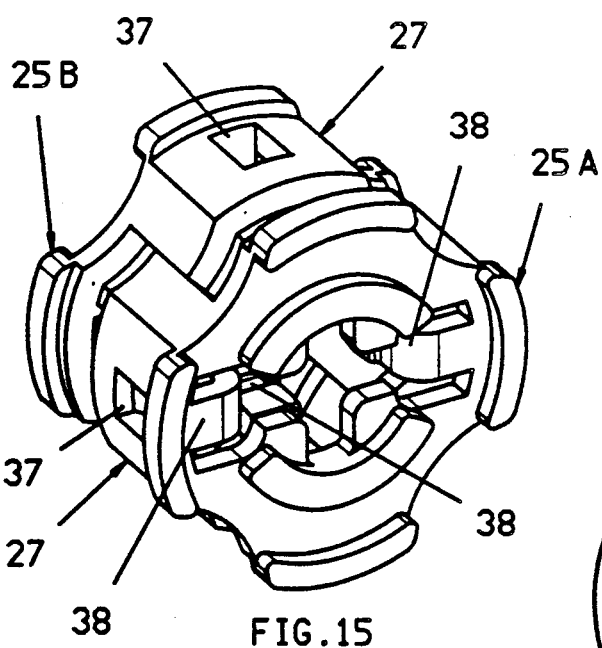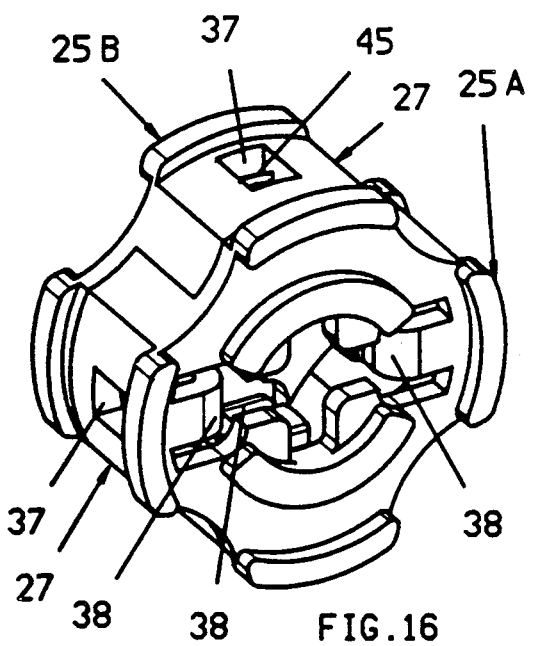

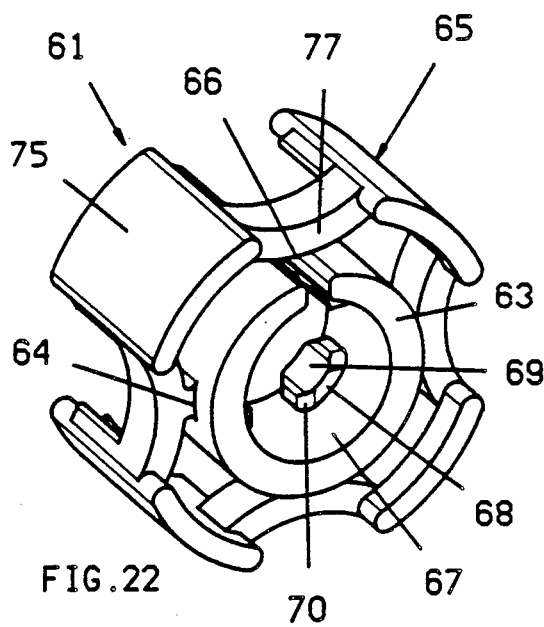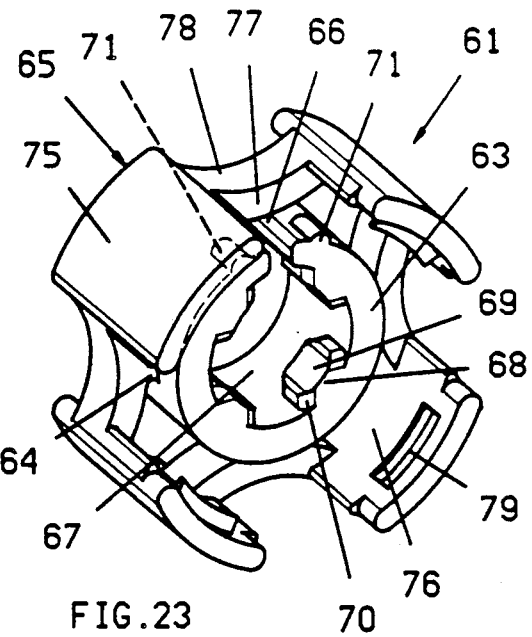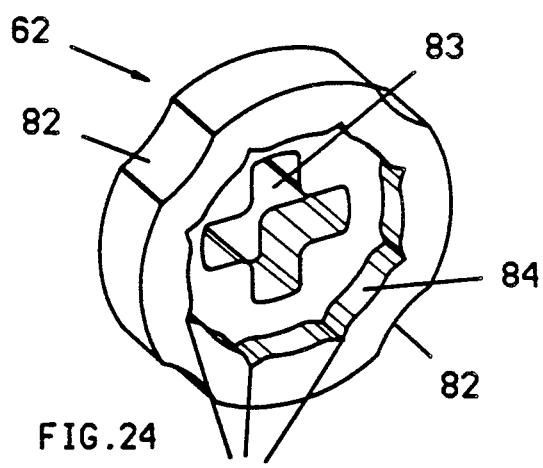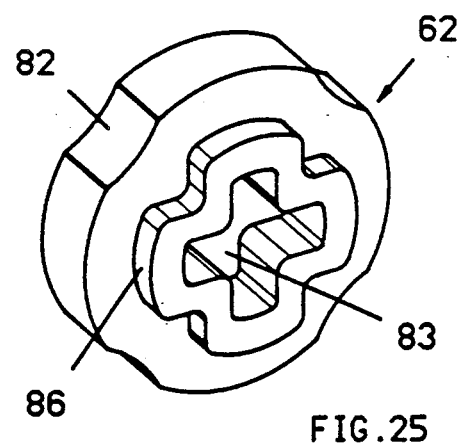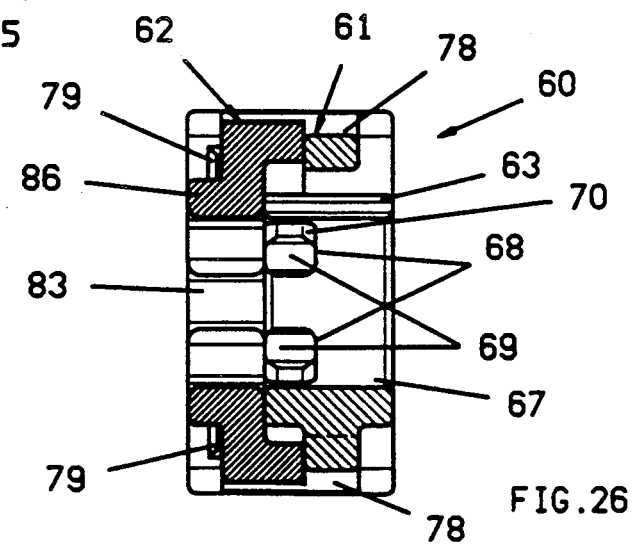

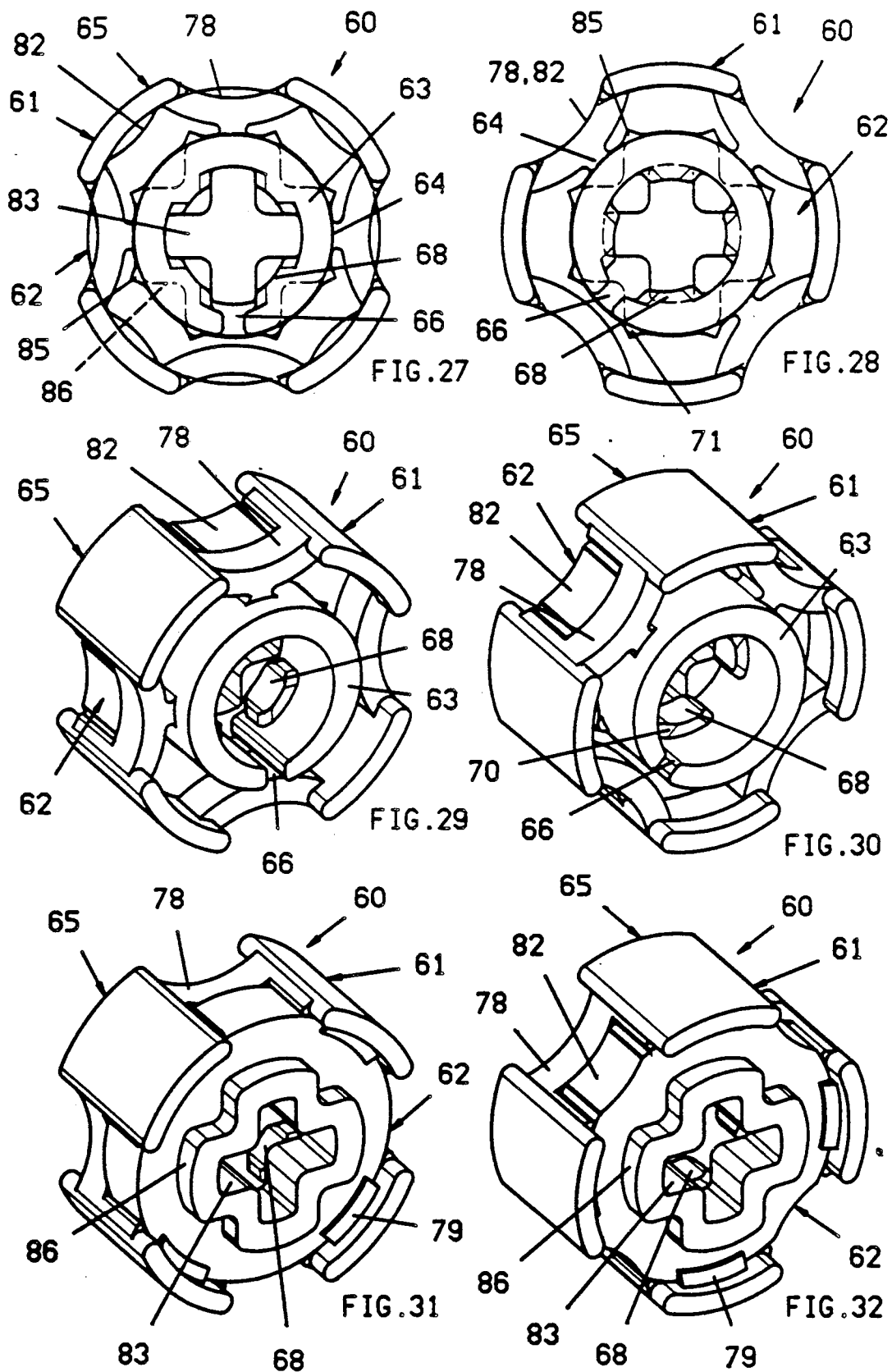

CONNECTING DEVICE FOR TOY CONSTRUCTION ELEMENTS

BACKGROUND OF THE INVENTION

The invention relates to a connection device for construction elements, in particular for toy-construction elements. The elements are provided with a shaft and a shaft bushing mountable on the shaft in the longitudinal direction thereof. The shaft has a cross section which deviates from a circular shape with a plurality of radially protruding cross sectional parts which have an outer face consisting of segments of a cylinder which are separated from each other by intermediary areas of smaller diameter. The shaft is provided with transverse grooves into which the shaft bushing is lockable for fixing its longitudinal position on the shaft. Such a connecting device is known from U.S. Pat. No. 3,638,352. This known connection device comprises a toy-construction unit with a wheel and a shaft. The wheel is provided with a wheel part and a hub part which is mounted by a flange to the wheel part. The wheel is detachably mounted with the shaft by means of a mounting element. The shaft is provided with a cross like cross section and transverse grooves. The wheel and hub part are provided with a reamed hole adapted to the cross section of the shaft. The mounting element is shaped as a spring ring which engages a transverse groove of the shaft being movably received in a recess provided in the wheel part and retained by the hub part. The flange of the hub part is mountable with the wheel part by means of coupling pins. In this known connection device a wheel can easily be slipped onto a shaft and mounted thereon without using any tools. While the connection is rotation-proof, the wheel can only support a limited axial load. From EP-A-0 273 863 a further connection device of the aforementioned type is known. Here, the shaft has two radially protruding cross sectional parts with saw tooth like transverse grooves offset from each other by 180°, as well as intermediary areas of smaller diameters. At each side of the radially protruding cross sectional parts a radial deflecting bar extends parallel to the shaft axis. The shaft bushing also has opposite offset areas with saw tooth like grooves offset by about 180°. Between these areas the throughgoing opening has a diameter which corresponds to the outer diameter of the radially protruding cross sectional parts of the shaft. The bushing can be displaced in the one rotating position along the shaft and can be rigidly connected with the shaft in an axial direction by rotating it by 90°. Thereby, the bars of the shaft lock into corresponding longitudinal grooves of the shaft bushing so as to prevent an undesired detaching of the connection device. A rotation proof connection in both directions between the shaft and the shaft bushing is not possible with this structure. Therefore, the device is unsuitable for connecting toy-construction elements.

SUMMARY OF THE INVENTION

It is an object of the present invention to provide a connection device of the aforementioned type that is particularly suitable for connecting toy-construction elements, enabling a rapid assembly and providing a secure connection axially as well as in both circumferential directions.

This object is attained by providing a connection device which includes a shaft bushing consisting of a first bushing part and a second bushing part. The two bushing parts are nondetachably connected with each other and movable relative to each other between a release position wherein the shaft bushing is displaceable axially along the shaft and a locking position, wherein at least one protrusion positively engages into one of the transverse grooves of the shaft. Cooperating locking elements are provided on the first and the second bushing part which lock in at least one of the positions of the two bushing parts, and at least one of the bushing parts is provided with a throughgoing opening adapted to the cross section of the shaft for a rotation proof engagement with the shaft.

BRIEF DESCRIPTION OF THE DRAWINGS

In the accompanying drawings:

FIG. 9 is a view of one front face of an exemplified embodiment of the inventive shaft bushing;

FIG. 10 is a sectional view along line X—X in FIG. 9;

FIG. 11 is a sectional view along line Xl—XI in FIG. 9;

FIG. 12 is a view of the other front face of the shaft bushing in accordance with FIGS. 9 to 11;

FIG. 13 is a perspective view of the one front face of the bushing part of the shaft bushing of FIGS. 9 to 12;

FIG. 14 is a perspective view of the other front face of the bushing part of FIG. 13 turned 90°;

FIG. 15 is a perspective view of a pulled out assembled shaft bushing composed of bushing parts in accordance with FIGS. 13 and 14;

FIG. 16 is a perspective view of the shaft bushing of FIG. 15 with its two bushing parts pressed together;

FIG. 22 and FIG. 23 are perspective views of a first bushing part of a further embodiment of a shaft bushing;

FIG. 24 and FIG. 25 are perspective views of a second bushing part for use with the bushing parts of FIG. 22 and FIG. 23;

FIG. 26 is an axial sectional view of the shaft bushing assembled from the first bushing part and the second bushing part of FIGS. 22-25;

FIGS. 27 and 28 are front views of the shaft bushing of FIG. 26 in the released and locked positions; and FIGS. 29 to 32 are perspective views of the shaft bushing of FIG. 26 in the locked and released position.

DETAILED DESCRIPTION OF THE PREFERRED EMBODIMENTS

Figure 1:
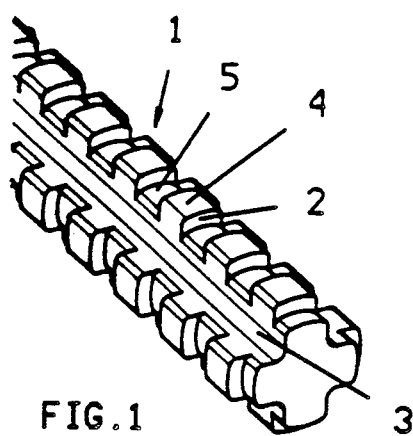
FIG. 1 is a perspective view of a section of a first embodiment of a shaft in accordance with the inventive connection device.
Figure 2:
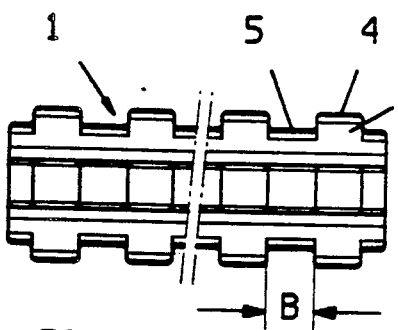
FIG. 2 is a side view of the shaft of FIG. 1.
Figure 3:
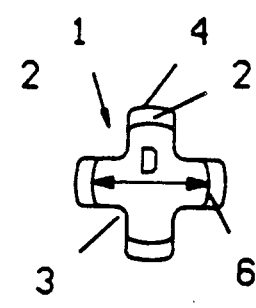
FIG. 3 is a front view of the shaft of FIG. 1.

Shaft 1 illustrated in FIGS. 1 to 3 is provided with a cross section which deviates from a circular shape by having four radially protruding cross sectional parts 2 generally in the form of a cross which are separated by intermediary areas 3 (FIGS. 1,3) in the circumferential direction and have a smaller diameter. Each cross sectional part 2 has an outer face 4 which is defined by a segment of a cylinder face so that the shaft 1 is insertable into a circular hole of a construction element. Shaft 1 is also provided with uniformly spaced grooves 5 having a uniform width B (FIG. 2). In the illustrated embodiment the width B of the transverse grooves is equal to that of parts 2. The transverse grooves 5 are provided with outer faces 6 (FIG. 3) which are formed by segments of a cylinder face having a diameter D (FIG. 3).

Figure 4:
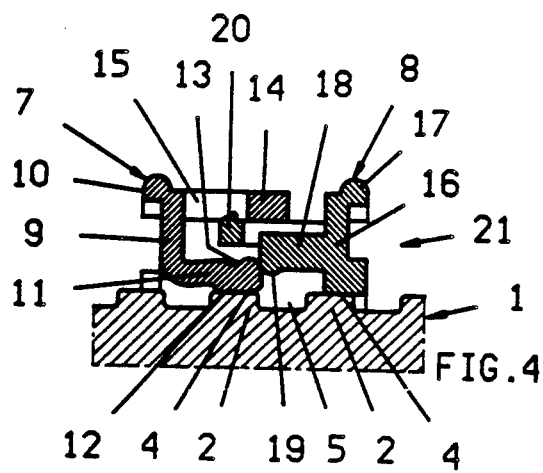
FIGS. 4 to 8 are sectional views of the semicircle segments of the shaft of FIG. 1 with an associated shaft box mounted thereon in different positions of the shaft bushing with respect to the shaft.

In FIG. 4 shaft 1 is illustrated with a shaft bushing mounted thereon in accordance with the invention. The shaft bushing consists of two separate but connected bushing parts 7 and 8.

The one bushing part 7 is provided with a front face 9 and has an opening in the shape of the cross section of shaft 1 of FIGS. 1 and 3, so that the bushing part 7 is displaceable longitudinally on shaft 1. The front face 9 is provided with an outer edge shoulder 10 which serves as a gripping element. A tongue 11 extending in the axial direction extends from front face 9 which has a degree of radial elasticity. Tongue 11 is provided on its radial inner face with a cam 12 and on its radial outer face with a groove like recess 13. In addition the bushing part 7 is also provided with a socket like segment 14 with a rectangular opening 15.

The bushing part 8 has an outer front face 16 which has an adapted cut out, not shown in detail, for shaft 1 of FIGS. 1 and 3, so that the bushing part is axially displaceable on shaft 1. The front face 16 is provided with an outer edge shoulder 17 in the form of a gripping element. An element 18 extending from the front face 16 in the longitudinal direction into the inside of bushing part 8 extends from this front face 16 and is provided with a radially inner protrusion 19. Element 18 has a relatively large wall thickness, so that in contrast to tongue 11 of bushing part 7 it is less elastic radially. Preferably, the element 18 is formed as a cam of a socket like shoulder (not shown in detail in FIG. 4) of front face 16. This socket like shoulder is also provided with a tooth like radial protrusion 20 which has low radial elasticity due to its recess.

As can be seen from FIG. 4 the bushing parts 7 and 8 of the illustrated shaft bushing are displaceable into each other within a defined path, whereby the bushing part 7 constitutes the outer and the bushing part 8 the inner sliding part. The relative displacement path is limited in the one direction (the push direction) in that the protrusion 20 and the inner face of the front face 16 of the bushing part 8 engage on bushing part 7. In the other direction (the pull direction) the relative displacement path is limited in that the outer protrusion 20 of the bushing part 8 abuts the socket like segment 14 of bushing part 7.

Therefore, it can be seen from FIG. 4 that the subject shaft bushing, which is composed of the two opposite axial displaceable bushing parts 7 and 8, is displaceable on shaft 1 by pressing the edge shoulder 17 of bushing part 8 in the direction of arrow 21, so that the inner protrusion 19 of the bushing part 8 pushes on the front face of tongue 11 of the bushing part 7. The only mechanical resistance which has to be overcome when mounting the bushing parts 7 and 8 on the shaft 1 is caused by the elastic bending of tongue 11 of bushing part 7 when gliding over the outer face 4 of cross sectional part 2 of shaft 1, see FIG. 4. The tongue 11 then pushes back the bushing part 7 into its rest position when it comes into engagement with cam 12 over transverse groove 5 of shaft 1, as illustrated in FIG. 6. Thus, the shaft bushing consisting of the bushing parts 7 and 8 can be pushed to a desired axial position over shaft 1, whereby the intermediary positions illustrated in FIG. 5 are noticeable and audible for the user because of the locking of cam 12 of tongue 11 of the bushing part 7 into a transverse groove 5 of shaft 1.

Figure 5:
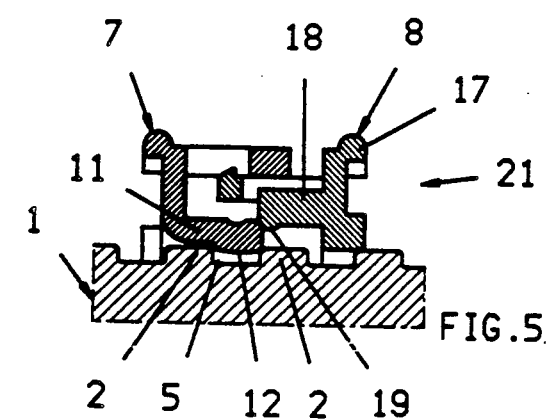
Figure 6:
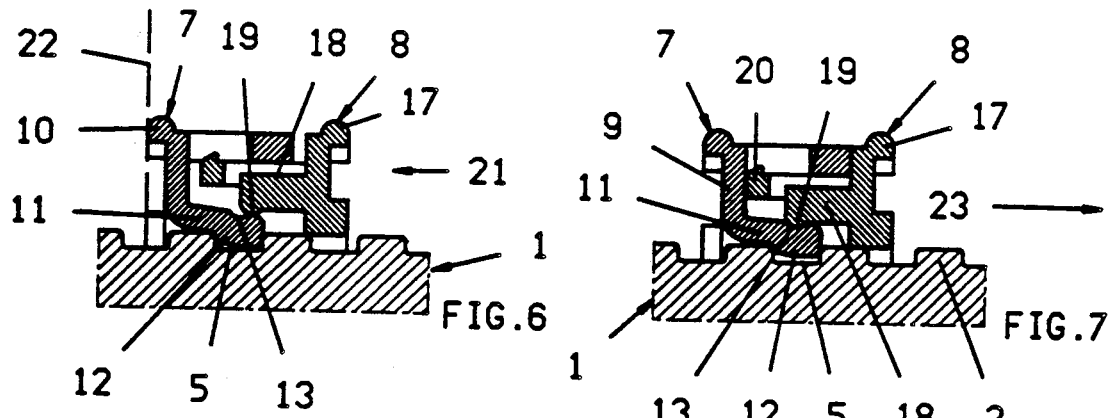
Figure 7:
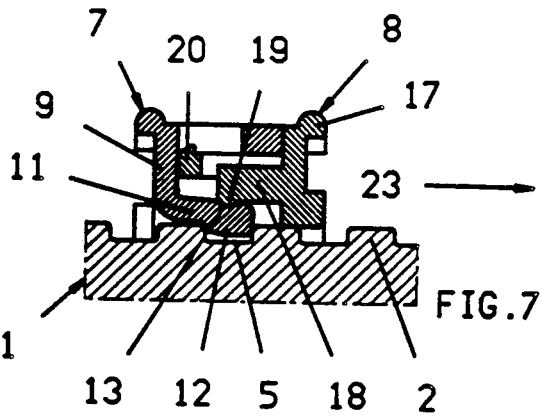

When the desired axial position of the shaft bushing is reached on shaft 1, that is, a position in accordance with FIG. 5, the bushing part 7 is locked on shaft 1 as the next step. To do this further axial movement of the bushing part 7 in the direction of arrow 21 is prevented by the bushing part 7 either being held manually or the bushing part 7 in the corresponding position on shaft 1 abuts with its front face on another stationary construction element. These two possibilities of movement inhibition are indicated in FIG. 6 by a dash-dot line. On the other hand, the exertion of pressure on the bushing part 8 is continued in the direction of arrow 21 (FIG. 6). Thereby the inner protrusion 19 of the bushing part 8 pushes the cam 12 of tongue 11 of the bushing part 7 deeper into the corresponding transverse groove 5 and then locks into the groove like recess 13 of tongue 11, as illustrated in FIG. 7. Further axial movement of the bushing part 8 is no longer possible, because its end engages protrusion 20 on the front face 9 of bushing part 7 and bushing part 7 is fixed with respect to shaft 1, since the cam 12 of its tongue 11 is pushed by the protrusion 19 of the bushing part 8 into the transverse groove 5 of shaft 1.

Thus, the pushed together bushing parts 7 and 8 which form the shaft bushing as illustrated in FIG. 7 are secured against axial displacement on shaft 1 under axial pressure. Accordingly, by means of one or a plurality of shaft bushings in accordance with FIG. 7 random construction elements which have holes corresponding to the cross section parts 2 of the shaft 1 may be stationary fixed with respect to bushing part 7 by a simple axial pressure exertion on the bushing part 8. As can be further seen from FIG. 7, the shaft bushing on shaft 1 extends axially by two length units of the shaft consisting of a cross sectional part 2 and a transverse groove 5.

To release the locked shaft socket of FIG. 7 and for removing the shaft socket from shaft 1 the outer edge shoulder 17 of bushing part 8 is gripped with the fingers and pulled in the direction of arrow 23 in FIG. 7. Since the bushing part 7 is anchored on shaft 1 it does not need to be retained. By pulling bushing part 8 its protrusion 19 slides thereby lowering cam 12 of tongue 11 into transverse groove 5 and moves out of the groove like recess 13 of the tongue 11, as had been explained in reverse sequence with respect to FIG. 6. By a further pulling of bushing part 8 in the direction of arrow 23 in FIG. 8 the shaft bushing is brought into the position illustrated in FIG. 5, whereupon in accordance with FIG. 8 the outer protrusion 20 of the bushing part 8 engages in the rectangular opening 15 of segment 14 of bushing part 7. Thus, during the pulling off of the bushing part 8 from shaft 1 in the direction of arrow 23 the bushing part 7 is also taken along.

A particularly advantageous embodiment of the inventive shaft bushing in conjunction with FIGS. 4 to 8 will now be explained in detail in conjunction with FIGS. 9 to 16. The embodiment to be described is based on the bushing parts 7 and 8 being identical and thereby may be assembled and connected with each other in the manner illustrated in FIGS. 4 to 8 with one of the two identical bushing parts being rotated by about 90° with respect to the other one. Not only is a simplified manufacturing of the shaft bushing obtained by virtue of a single part, but also an improved locking is obtained.

In FIGS. 9 and 12 the two front faces of a single bushing part 25 are illustrated and in FIGS. 10 and 11 sections through the bushing part 25 in two vertical planes with respect to each other are illustrated. As can be seen from the halve section of FIGS. 4 and 8, the bushing part 25 is axially symmetric.

The bushing part 25 has a flange 26 and extended socket segments 27 and 28 which extend only over angle ranges of 90°. At its center flange 26 is provided with a cross like opening 29 (FIGS. 9,12) wherein shaft 1 of FIGS. 1 to 3 fits in such a manner that the bushing part 25 is mounted on shaft 1, but cannot be rotated on the same. Flange 26 and the extended socket segments 27 and 28 have areas of different form and dimensions. As is particularly apparent from FIG. 9, flange 26 is provided with four alternating outwardly curved edge areas 30 and four alternating inwardly curved edge areas 31. The outwardly curved edge areas 30 of flange 26 are provided with an axial and radial protruding edge shoulder 32 (FIGS. 10,11). The socket segments 27 and 28 seen in FIG. 12 also are each formed with one outwardly curved segment 33 or 34 and at both sides of segments 33,34 with an inwardly curves segment 35 or 36. Thereby, the socket segments 28 are offset radially to the inside with respect to the socket segments 27, but their outer faces engage flush with the inner faces of socket segments 27.

In FIG. 10 it can be seen that the two socket segments 27 are provided with rectangular openings 37. In the angle area of the two socket segments 27 tongue 36 extends from flange 28 which extends into the inside socket segment 27. The tongue 38 is separated from flange 26 by two slot like openings 39 (FIG. 9), so that the tongue 38 can elastically bend in both radial directions. On its radial inner faces the tongue 38 is provided with a rounded off cam 40, whose length in the axial direction is equal to the width B of transverse grooves 5 of shaft 1 of FIG. 2. On its radial outer face the tongue 38 is provided with a groove like recess 41. The extended curved ribs 42 (FIG. 9) on flange 26 between opposite slot like openings 39 are provided for reinforcing flange 26.

From FIGS. 11 and 12 it can be seen that socket segments 28 are each provided with one radially extending cam 43 on the inside and an inner protrusion 44 which corresponds to the groove like recess 41 of tongue 38. At its outer end area each socket segment 28 is also provided with a tooth-like protrusion 45. The cams 43 are extended from flange 26 (FIGS. 10,11) and surrounded by an opening 46. Thus, the cams 43 are given a certain radial elasticity which is less than the radial elasticity of tongues 38. The importance of this radial elasticity of the cams 43 will be explained in detail in the following.

It can be seen from FIG. 10, the sectional illustration of the bushing part 25, that the sectional parts of the bushing part 7 correspond to FIGS. 4 to 8. Furthermore, it can be seen from the 90° rotated sectional illustration of the bushing part 25 in accordance with FIG. 11 correspond to the FIGS. 4 to 8. Thus, the bushing part 25 is provided with the functional parts of bushing part 7 as well as the ones of bushing part 8 of FIGS. 4 to 8 in 90° rotated diametric positions. Consequently, two identical bushing parts 25 may be used in accordance with FIGS. 9 and 12 the shaft bushing with the bushing parts 7 and 8, in that the two bushing parts 25 are connected with each other in axial direction relatively rotated by about 90°.

In FIGS. 13 to 16 the process of forming a shaft bushing from two bushing parts 25 is shown in perspective views. In these FIGS., one of the identical bushing parts is designated 25A and the other 25B.

The bushing part 25A corresponds to the front face view of bushing part 25 in accordance with FIG. 9, however in a 90° rotated position with respect to the position in FIG. 9 (view to the flange side). The bushing part 25B corresponds to the front face view of the bushing part 25 in accordance with FIG. 12 (view on the open side). From FIGS. 13 and 14 it can be seen that the bushing part 25A (FIG. 13) with its open front face 47 can be pushed onto the open front face 48 of the bushing part 25B (FIG. 14). This is possible because the socket segments 27 and 28 of both bushing parts 25A and 25B are complementary to each other in the radial direction as well as in circumferential direction in such a manner that a sort of slide seat is provided between the bushing parts 25A and 25B. From FIGS. 10 and 11 it can be further seen that during the mounting of bushing part 25A on bushing part 25B (or vice versa) the tooth like protrusion 45 of both bushing parts 25A and 25B locks into the radially opposite opening 37 of the other bushing part so that the two bushing parts 25A and 25B are no longer separable but are relatively displaceable in the axial direction as has already been explained in conjunction with FIGS. 4 to 8.

In FIGS. 15 and 16 the two assembled bushing parts 25A and 25B are perspectively illustrated. FIG. 15 depicts the relative position of bushing parts 25A and 25B in a pulled apart condition in accordance with FIG. 4, while in FIG. 16 the assembled condition of the bushing parts 25A and 25B are illustrated corresponding to FIG. 7. From FIGS. 15 and 16 it can be seen that the two bushing parts 25A and 25B with their socket segments 27 and 28 (in FIGS. 15, 16 only the socket segment 27 is visible) may slide in the longitudinal direction as well as in the radial direction either adjacent to each other or superimposed, as can be seen from FIG. 12. The handling of the inseparably connected, commonly displaceable axially shaft bushing in accordance with the invention formed by bushing parts 25A and 25B is therefore very simple and handy for locking the mentioned shaft bushing on a shaft in accordance with FIGS. 1 and 3.

It should be noted that the shaft bushing consisting of the encased bushing parts 25A and 25B is provided with four tongues 38 (in FIGS. 15, 16 three tongues are visible), each having on associated cam 43 (in FIGS. 15, 17 no cam 43 is visible), in order to lock the tongues 38 in one and the same transverse groove 5 of shaft 1 (FIGS. 1 to 3), when the two bushing parts 25A and 25B are completely enmeshed with one another up to the abutment.

Figure 8:
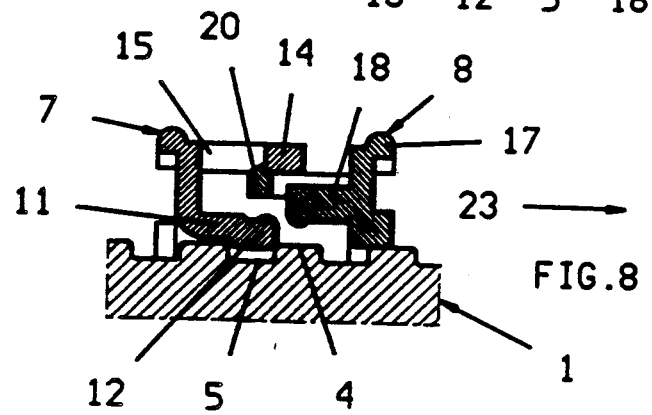

In a locking procedure as has been described heretofore with respect to FIGS. 4 to 7 or in a locking procedure described in conjunction with FIGS. 7 and 8 a particular situation has to be taken into consideration when using a shaft bushing consisting of bushing parts 25A and 25B. The bushing part 25A or 25B which is mounted on shaft 1 for locking would engage fixedly and nonmovably with its tongues 38 on the cams 43 of the other stationary bushing part 25B or 25A during the sliding movement, since the tongues 38 cannot yet be locked into the transverse groove 5 of shaft 1, but support on the outer faces 4 of the preceding transverse part 2 and thereafter are immovable radially to the inside. In order to prevent such an undesirable locking of the sliding movement the cams 43, as already mentioned, have a certain elasticity so that they can slide over the tongues 38 of the mounted bushing part. The radial elasticity of the cams 43 is however not so large as the one of the tongues 38, so that the tongues 38 of the mounted bushing part are pushed into the transverse groove 5 by the cams 43 of the stationary bushing part into which the tongues 38 of the stationary bushing parts have already locked.

Although the shaft bushing consisting of the bushing parts 7 and 8 or 25A and 25B is dependent upon the cross sectional form of the intended shaft, it can be seen that other cross sectional forms of the shaft can be utilized by slight changes of the bushing parts. The shape of the opening 29 of flange 26 is the deciding factor, because it has to correspond to the intended shaft. It is assumed that the shaft cross section is axially symmetric that is, four identical cross sectional parts offset by 90°.

Figure 17:
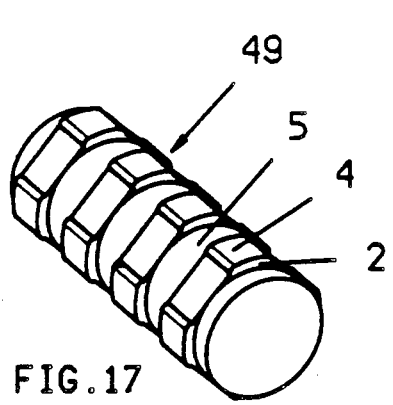
FIG. 17 is a perspective view of a second embodiment of a shaft of the connection device.
Figure 18:
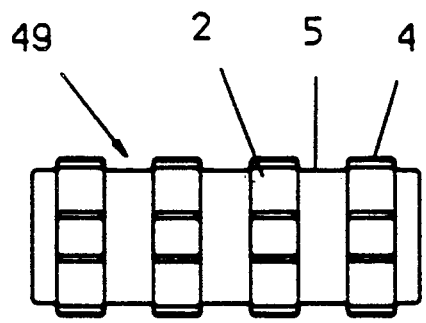
FIG. 18 is a side view of the shaft of FIG. 17.
Figure 19:
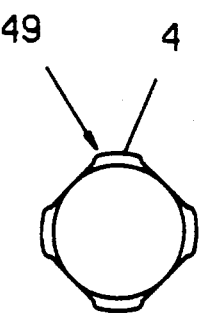
FIG. 19 is a front view of the shaft of FIG. 17.

In FIGS. 17 to 19 a shaft 49 is illustrated which also has a non-circular cross section and is substantially square with corners that are flattened or rounded off and which have outer faces 4 which again are formed by the segments of a circular face. The shaft 49 is provided with transverse grooves 5 between parts 2. A shaft bushing provided for shaft 49 is composed of two bushing parts similar to bushing parts 25A and 25B of FIGS. 15 and 16, whereby the center opening of the two bushing parts has a form corresponding to the cross section of shaft 49. The radial rest position of the two tongues 11 or the four tongues 38 must be complementary to the diameter of the outer faces 4 of shaft 49 of FIGS. 17 to 19, or vice versa. The function of the correspondingly modified shaft socket (not shown) on shaft 49 of FIGS. 17 to 19 is the same as the shaft socket of FIGS. 13 to 16 on shaft 1 of FIGS. 1 to 3, consisting of the two connected bushing parts 25A and 25B.

Figure 20:
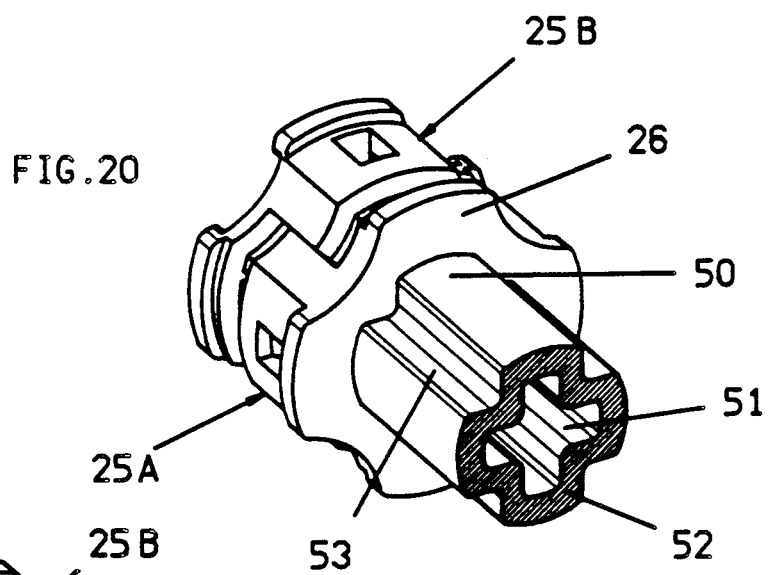
FIG. 20 is a perspective view of an embodiment of the connection device in accordance with the invention wherein the shaft bushing is provided with an axial extension shoulder for receiving a shaft.

In the embodiment illustrated in FIG. 20, the shaft bushing consists of the interlocking bushing parts 25A and 25B (see also FIGS. 15 and 16). The one bushing part 25A is provided with an axial extension shoulder 50 on its flange 26 (see FIG. 9) which is extended to flange 26. The shoulder is provided with an axial feed through opening 51, whose cross section corresponds exactly to the cross shaped opening 29 of the bushing part 25 illustrated in FIG. 9 and is therefore designed for receiving a shaft 1 in accordance with FIG. 1. Accordingly, when the shaft bushing 25A/25B of FIG. 20 is mounted on a shaft 1 in accordance with FIG. 1 in the aforedescribed manner, a further shaft can be inserted into the open end in accordance with FIG. 20. In FIG. 20 the end face 52 of the open end of shoulder 50 is illustrated by hatched lines to indicate that the shoulder 50 can have any given length. By the hatch line illustration of the end face 52 it is further indicated that further connecting elements (not shown) may extended from the end face 52 which permit a connection of the shoulder 50 and thereby shaft bushing 25A/25B with another construction element either coaxially or in a vertical direction with respect to the shoulder 50. The longitudinal recesses 53 illustrated on the outer face of shoulder 50 have no mechanical function, but merely serve to reduce the material necessary.

Figure 21:
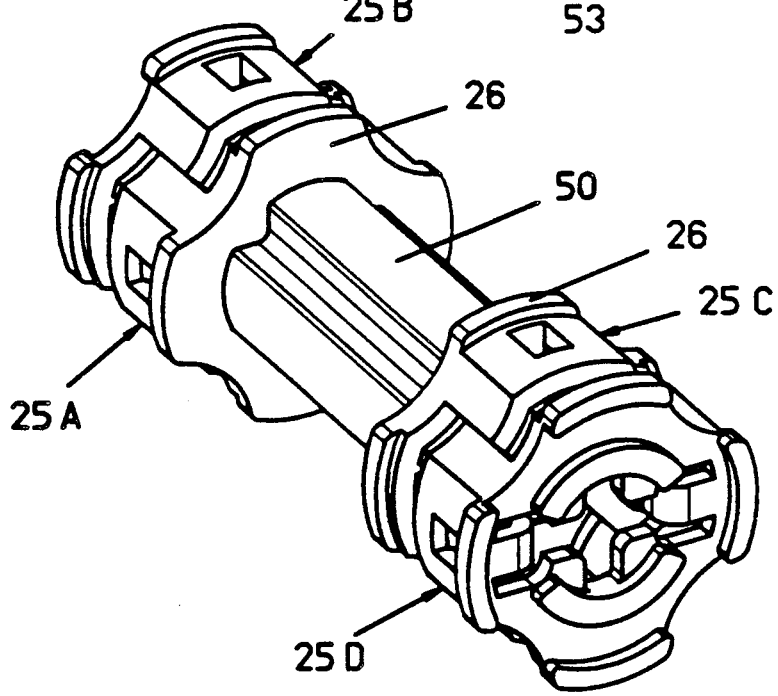
FIG. 21 is a perspective view of the connection device in accordance with the invention as a shaft coupling.

In the embodiment of FIG. 20 a shaft (not shown) is inserted into shoulder 50 and fixedly connected with the shaft in the one or other rotating direction on which the shaft bushing 25A, 25B is anchored, but obviously not in the axial direction. In order to obtain a rigid detachable connection device of two shafts 1 in accordance with FIG. 1 in any direction, it is provided in accordance with FIG. 21 to fixedly extend the end face 52 of flange 50 of FIG. 20 to the front face flange 26 corresponding to FIG. 9 of a further bushing part 25C, which is formed in the same manner as the bushing part 25 illustrated in FIG. 9 and which forms a second shaft bushing in conjunction with an identical bushing part 25D being integrated with each other and which is in conformity with the shaft bushing 25A/25B. Accordingly, the one shaft bushing 25A/25B is anchored on the end area of a first shaft and the shaft bushing 25C/25D on the end area of a second shaft, whereby the shoulder 50 receives protruding ends of the shafts. Since the anchoring of each shaft bushing 25A/25B or 25C/25D is fixed on its shaft in the rotating direction as well as in the axial direction, a corresponding fixed connection is provided for the two shafts.

In conjunction with FIGS. 15 and 16 a shaft bushing in accordance with the invention has been described which is composed of two identical interlocked bushing parts 25A and 25B. Thereby, each bushing part 25A, 25B is provided with two tongues 38 and two cams 43 in a diametric opposed arrangement so that the cams 43 of the one bushing part can act on the tongues of the other bushing part. To this end the two bushing parts 25A, 25B are assembled rotated 90° with respect to each other. The same principle may be applied with additional bushing parts and additional tongues arranged diametrically opposed in each bushing part, for example, with four tongues and cams in each bushing part.

It is also possible to provide sets of two bushing parts where three tongues are offset by 120° and the three cams are also offset by 120°. The two identical bushing parts of this type are assembled at an offset angle position of 60° with respect to each other by enmeshing the same. Naturally, the other parts of these bushing parts, like socket segments 27 and 28, openings 37 and the protrusions 45 of the bushing part 25 illustrated in FIGS. 9 to 12 must be adapted to the three division arrangement. Furthermore, the associated shaft must have a symmetry with respect to its angle position of 60°.

In the exemplified embodiment illustrated in FIGS. 4–16, the bushing parts 7, 8 are axially displaced with respect to each other for securing purposes. However, it is also possible to realize the securing of the two bushing parts with respect to each other by rotating the two parts against each other. In this case the two bushing parts cannot be shaped identically, but the securing bushing part must be rotatable with respect to the shaft 1 and must therefore have a cylindrical through bore. As distinct from the aforedescribed embodiments, the securing element which engages the elastic tongue 11 with the cam 12 must not be radially elastic. Thus a stronger axial securing can be obtained despite a smaller force for securing.

A further embodiment of the shaft bushing 60 in accordance with the invention is illustrated in FIGS. 22 to 23, which is movable between a release position in which the shaft bushing is axially movable along the shaft 1 (FIGS. 1 to 3) and a locking position in which radial protrusions positively lock into the transverse grooves 5 of shaft 1.

The first bushing part 61 (FIGS. 22 and 23) consists of a socket 63 and a turning member 65 being integrally formed and being interconnected by three ribs 64. The socket 63 has a continuous longitudinal slot 66 and a cylindrical inner face 67, whose diameter corresponds to the diameter of the outer face 4 of shaft 1. Four radial protrusions 68 extend inwardly from inner face 67 for engagement into transverse grooves 5 of shaft 1. These protrusions 68 are formed as follows:

The radial protrusions 68 are uniformly distributed in the circumferential direction, in this case offset by 90°;

the width of each protrusion 68 in the axial direction of the socket 63 is at most equal to the width B of the transverse grooves 5 of shaft 1 (FIG. 2);

the protrusions 68 are provided with cylindrical inner faces 69, whose diameter is at least equal to the diameter D of the transverse grooves 5 of shaft 1 (FIG. 3);

the dimension of each protrusion 68 in the circumferential direction is at most equal to the dimension in the circumferential direction of the intermediary areas 3 of shaft 1 (FIG. 3); and for simplifying the introducing into the transverse groove 5 of shaft 1 the protrusions 68 have on both sides wedge like bevels 70.

Adjacent to the longitudinal slot 66 the socket 63 has on its end area at both sides of the longitudinal slot 66 a radially outwardly extending locking nose 71. The socket wall can yield radially inward through the longitudinal slot in the area of the locking nose 71.

The rotating member 65 consists of four circular cylinder segment like outer gripping parts 75 with cylindrical inner faces 76 and connecting parts 77 which form gripping indentations 78 for facilitating manual rotating. The gripping parts 77 are axially longer than socket 63. Wedge like locking protrusions 79 extend radially inward from the inner faces 76 of gripping parts 75.

The second bushing part 62 (FIGS. 24 and 25) is formed as a disk and has an outer diameter which corresponds to the inner diameter of the gripping parts 75. Four indentations 82 are provided on the outer circumference distributed to correspond to the gripping indentations 78. The bushing part 62 has a through opening 83, whose cross section corresponds to the cross section of shaft 1 (FIGS. 1-3). On one face the bushing part 62 has a cylindrical countersink 84 whose diameter corresponds to the outer diameter of socket 63. Eight locking notches 85 are uniformly distributed about the circumference in the peripheral wall of countersink 84. On the opposite face the bushing part 62 has a cross like protrusion 86.

For assembly the bushing part 62 is pushed between the gripping parts 75 with countersink 84 ahead until it locks behind the locking protrusions 79 and is thereby undetachably mounted in bushing part 61. The two locking noses 71 of socket 63 lock in two of locking notches 85 in such a manner that the protrusions 68 do not extend into the cross section of opening 83 (FIGS. 27, 29 and 31). In this release position the shaft bushing 60 can be displaced in the axial direction on shaft 1. When the desired axial position of the shaft bushing 60 on the shaft 1 is attained, the socket part 61 is rotated 45° so that the two locking noses lock into the next two locking notches 85 and the four protrusions 68 engage positively locking in the corresponding transverse grooves 5 of shaft 1, so that the shaft bushing 60 is secured on shaft 1 and is axially nondisplaceable. In the secured position the indentations 82 are flush with the gripping indentations 78, so that it is immediately visible whether the shaft bushing 60 is in its secured position or in the release position. The indentations 82 are also advantageous when on the same shaft 1 two shaft bushings 60 are mounted and a defined bushing of these two bushings should be rotated into the released position. For this purpose one grips with ones fingers of the one hand into indentations 82, 72 of the one shaft bushing and rotates with the other hand the bushing part 61 of the other bushing to be released. In this embodiment the locking into the secured position is also noticeable and audible.

As in the embodiment in accordance with FIG. 20, the protrusion 86 of the second bushing part 62 may be axially longer so as to connect two shafts 1 fixedly with each other. It is also possible to form a wheel, for example, on the protrusion 86 which is then fixedly mounted with shaft 1 and axially nondisplaceably connected therewith. A further identical bushing part 62 may be provided on the extended protrusion 86 on which a further bushing part 61 may be mounted. Thus two shafts 1 can be fixedly and axially nondisplaceably connected with each other.

We claim:

1. A connecting device for toy-construction elements comprising:

a shaft and a shaft bushing mountable in a longitudinal direction of the shaft;

said shaft having a cross section deviating from a circular shape by a plurality of radially protruding cross section parts having outer faces which consist of segments of a circle separated from each other by intermediary areas of a smaller diameter; said radially protruding cross section parts and said intermediarary areas defining a plurality of longitudinally spaced apart circumferentially extending grooves on the radially protruding cross section parts;

said shaft bushing being lockable on said shaft and consisting of a first bushing part and a second bushing part; said two bushing parts being nondetachably connected to each other and movable against each other between a release position and a locking position, wherein in the release position said shaft bushing is displaceable axially along said shaft and in the locking position said bushing is indisplaceable axially along said shaft;

at least one protrusion on one of said bushing parts which locks in one of said circumferentially extending grooves of said shaft when said bushing is in the locking position;

and cooperating locking elements of said first and second bushing parts which interengage in at least one of said positions;

at least one of said bushing parts having an opening therein conforming to the cross section of the shaft for receiving the shaft therein.

2. The device in accordance with claim 1, wherein said two bushing parts are connected with each other by a snap connection.

3. The device in accordance with claims 1 or 2, wherein a base of said circumferentially extending grooves of the shaft is cylindrical.

4. The device in accordance with claims 1 or 2, wherein said two bushing parts are rotatably connected to each other, and said locking elements are formed as extended noses on one bushing part and receiving recesses for said noses on the other bushing part.

5. The device in accordance with claim 4, wherein said first bushing part has a socket part with a substantially circular inner face whose diameter is equal to the diameter of the circular outer face of the shaft; said protrusion protrudes radially to the inside from said circular inner face, and said second bushing part is provided with a feed through opening conforming to the cross section of said shaft.

6. The device in accordance with claim 5, wherein said socket part includes a rotating member with a plurality of gripping indentations; said second bushing part is provided with indentations on its outer circumferential face, whose number, angular offset and dimensions conform with the gripping indentations of said rotating member, and said indentations of said second bushing part are flush with said gripping indentations of said rotating member in the locking position.

7. The device in accordance with claim 5, wherein said socket part has at least one continuous longitudinal slot, and said locking noses extend on an outer circumference of said socket part adjacent to said longitudinal slot.

8. The device in accordance with claim 6, wherein said socket part has at least one continuous longitudinal slot, and said locking noses extend on an outer circumference of said socket part adjacent to said longitudinal slot.

9. The device in accordance with one of claims 1 or 2, wherein said first bushing part has said opening corresponding to the cross section of said shaft and is provided with at least one radially elastic element on which said protrusion is extended, and said second bushing part has a pressure element which overtops said elastic element in the locking position for locking said protrusion in one of said transverse grooves of said shaft.

10. The device in accordance with claim 9, wherein said locking elements are formed by cooperating further protrusions and recesses on said elastic element and on said pressure element.

11. The device in accordance with one of claim 1 or 2, wherein said two bushing parts are rotationally fixedly connected with each other and are axially displaceable with respect to each other.

12. The device in accordance with one of claims 1 or 2, wherein said two bushing parts are identical and are telescopically pushed into each other at a 90° offset.

13. The device in accordance with one of claims 1 or 2, wherein said shaft bushing is provided with a plane front face at its axial end formed by peripheral edge segments and central annular like parts, said shaft bushing being set back with respect to said front face in an annular region between said edge segments and said annular like parts.

14. The device in accordance with one of claims 1 or 2 wherein said shaft bushing is engageable with said shaft and another similar shaft.

15. The device in accordance with one of claims 1 or 2 further comprising a pair of shaft bushings engageable with said shaft and each with another similar shaft.

* * * * *